United States Patent [19]

Munt

[11] Patent Number: 4,466,043

[45] Date of Patent: Aug. 14, 1984

[54] GAS DISCHARGE SURGE VOLTAGE ARRESTER AND PRODUCTION METHOD

[75] Inventor: Hartwig Munt, Berlin, Fed. Rep. of Germany

[73] Assignee: Siemens Aktiengesellschaft, Berlin and Munich, Fed. Rep. of Germany

[21] Appl. No.: 362,549

[22] Filed: Mar. 26, 1982

[30] Foreign Application Priority Data

Apr. 2, 1981 [DE] Fed. Rep. of Germany ....... 3113349

[51] Int. Cl.[3] .............................................. H02H 9/06

[52] U.S. Cl. .................................... 361/120; 361/129; 313/596; 313/306

[58] Field of Search ............... 361/120, 118, 129, 130, 361/117; 313/231.11, 242, 306, 325, 311, 291, 313/307, 596, 595, 581, 601, 602; 315/60, 36

[56] References Cited

U.S. PATENT DOCUMENTS

| | | | |
|---|---|---|---|
| 2,990,492 | 6/1961 | Wellinger et al. | 361/120 X |
| 3,454,811 | 7/1969 | Scudner, Jr. | 361/120 X |
| 3,588,576 | 6/1971 | Kawiecki | 361/120 X |
| 3,959,696 | 5/1976 | Lange et al. | 361/120 |
| 3,979,646 | 9/1976 | Peche et al. | 361/120 |
| 3,989,985 | 11/1976 | Lange et al. | 361/120 |
| 4,317,155 | 2/1982 | Harada et al. | 361/120 |

FOREIGN PATENT DOCUMENTS

| | | |
|---|---|---|
| 1188708 | 3/1965 | Fed. Rep. of Germany . |
| 2346174 | 3/1975 | Fed. Rep. of Germany . |

*Primary Examiner*—Patrick R. Salce
*Attorney, Agent, or Firm*—Herbert L. Lerner; Laurence A. Greenberg

[57] ABSTRACT

Surge voltage arrester with a gas-tight housing wherein two truncated cone-shaped electrodes are disposed respectively opposite one another and form a gap therebetween, the electrodes being received in opposite ends of a tubular insulating body and being formed with a bottom surface facing into the tubular insulating body and a lateral conical surface, including at least one strip of electrically conductive material serving as an ignition strip, said strip extending within the tubular body over part of the length thereof in direction from one to the other electrode, at least a part of the ignition strip terminating at a first distance opposite the lateral surface of the one electrode and at a second distance short of the bottom surface of the one electrode, at least one of the distances being shorter than the length of the gap.

11 Claims, 3 Drawing Figures

GAS DISCHARGE SURGE VOLTAGE ARRESTER AND PRODUCTION METHOD

Figure 1:
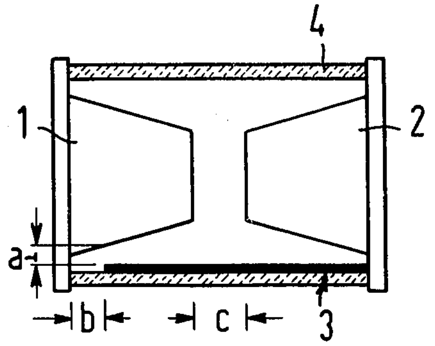

The invention relates to a surge voltage arrester with a gas-tight housing, wherein truncated cone-shaped electrodes are disposed opposite one another and form a gap therebetween, the electrodes being inserted into the ends of a tubular insulating body within which at least one strip of electrically conductive material serving as an ignition strip extends over part of the length of the tube in direction from one to the other electrode.

Such a surge voltage arrester is known from U.S. Pat. No. 3,989,985. In this heretofore known surge voltage arrester, the response voltage is supposed to be uninfluenced or unaffected by the distance of the ignition strip from the counter electrode. For this purpose, provision is made for the ignition strip tied or connected to the one electrode to extend beyond the height of the gap, and the distance of the ignition strip from the counter electrode to be greater than the length of the gap between the two electrodes.

It has been desired for a long time to introduce surge voltage arresters, of which the ignition voltage is the same in bright light as in the dark. Arresters which do not contain radioactive substances have the following characteristic, however. If the arresters are brought from a bright room into darkness, the ignition voltage thereof is about 2% above that in a bright room. If the arresters are stored in the dark for several hours or days, the ignition voltage thereof increases to double the value, the spread of the lot being between 2% and 100% drift.

So that the surge voltage arresters may be used in the dark, radio-active substances have heretofore been introduced into the arrester. Gas discharge tubes, particularly surge voltage arresters of this general type have become known heretofore, for example, from German Published Prosecuted Application No. 1 188 708. For pre-ionization of the gas content which is formed for example of argon or helium, an annular band of nickel 63 is applied to the inside of a tubular insulating body in the region between the electrodes. Krypton 85 has also been found to be suitable for pre-ionization.

Practially all solid or gaseous radioactive preparations are suited for pre-ionizing the gas content, the half life thereof being in the order of magnitude of the life of the component. As gases, besides Krypton 85, tritium is also used and, as solid substances, promethium 147 or radium 226 is suitable. The grave disadvantage of using radioactive preparations is that because of the pulverulent or gaseous nature thereof, the possibility of contamination of the environment always exists. The use of radioactive substances therefore requires extensive safety measures to be taken by the manufacturer of arresters as well as by the users or consumers thereof. The disposal of defective arresters is also a problem.

It is an object of the invention to provide a gas discharge surge voltage arrester wherein no radioactive substances are used and which has in the dark only 2% drift of the ignition voltage caused by the dependence of the liberation coefficient upon light.

With the foregoing and other objects in view, there is provided, in accordance with the invention, a surge voltage arrester with a gas-tight housing wherein two truncated cone-shaped elelctrodes are disposed respectively opposite one another and form a gap therebetween, the electrodes being received in opposite ends of a tubular insulating body and being formed with a bottom surface facing into the tubular insulating body and a lateral conical surface, including at least one strip of electrically conductive material serving as an ignition strip, the strip extending within the tubular body over part of the length thereof in direction from one to the other electrode, at least a part of the ignition strip terminating at a first distance opposite the lateral surface of the one electrode and at a second distance short of the bottom surface of the one electrode, at least one of the distances being shorter than the length of the gap.

In accordance with another feature of the invention, the strip is electrically connected to the other electrode In accordance with a further feature of the invention, the strip, at opposite ends thereof, is located respective first and third distances opposite and away from the respective lateral conical surfaces of the one and the other electrode and respective second and fourth distances short of the respective bottom surfaces of the one and the other electrode, respective sums of the first and third distances, on the one hand, and of the second and the fourth distances, on the other hand, being smaller than the length of the gap.

In accordance with an additional feature of the invention, the strip is electrically connected at both ends thereof to the respective electrodes and is formed with a break therein having a length shorter than the length of the gap.

In accordance with an added feature of the invention, the break in the strip is located away from the gap.

In accordance with yet another feature of the invention, the first distance and the sum of the first and the third distances, respectively, are smaller than the second distance and the sum of the second and the fourth distances, respectively.

In accordance with yet a further feature of the invention, the electrodes have an activating material on active surfaces thereof, the activating material having a liberation coefficient greater than that of the material of the strip.

In accordance with yet an additional feature of the invention, the strip is formed of pencil graphite.

In accordance with yet an added feature of the invention, the tubular insulating body is formed of glass having at least the inner surface thereof roughened by etching.

In accordance with an alternate feature of the invention, there is provided, initially terminating the part of the ignition strip at a distance shorter than the first and the second distances, respectively, from the lateral conical surface and the bottom surface of a respective electrode, burning off the respective end of the strip to the first and the second distances after gas-tightly sealing off the arrester by applying a voltage to and firing the arrester.

In accordance with a still further feature of the invention, the strip is formed of graphite and includes adding 0.1% to 10% oxygen to the atmosphere within the arrester when fusing the electrodes into the tubular insulating body so as to accelerate combustion of the graphite.

The invention of the instant application is based upon the following realizations: In each lot of arresters there are units which have relatively good ignition characteristics in darkness even without radioactive substances.

Calculation of the transit time of electrons and ions in the arrester shows that when a voltage, for example, of 15 V is applied, all electrons travel from the gas space to the electrodes in 1 ns (nanosecond) and all ions in a few μs (microseconds), and are neutralized. Arresters without radioactive substances therefore must have the long ignition delays thereof immediately after they have been brought into darkness, when the sawtooth-shaped rising ignition voltage is applied, and not hours or days later.

In addition, one free electron is sufficient to make the arrester conduct and this need not necessarily come from a radioactive substance but may have been generated due to cosmic radiation or the activating material or also the field emission at the arrester electrodes or the field emission along the ignition strip break or interruption.

Other features which are considered as characteristic for the invention are set forth in the appended claims.

Although the invention is illustrated and described herein as embodied in gas discharge voltage arrester and production method, it is nevertheless not intended to be limited to the details shown, since various modifications and structural changes may be made therein without departing from the spirit of the invention and within the scope and range of equivalents of the claims.

Figure 2:
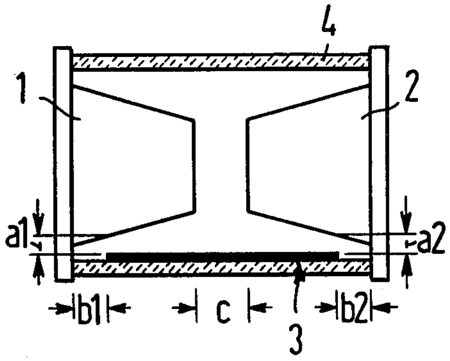
Figure 3:
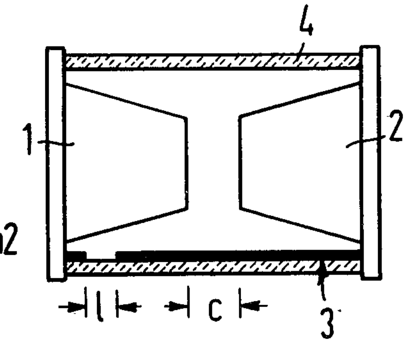

The construction and method of operation of the invention, however, together with additional objects and advantages thereof will be best understood from the following description of specific embodiments when read in connection with the accompanying drawings, in which:

FIGS. 1, 2 and 3 are diagrammatic longitudinal sectional views of three different embodiments of the gas discharge surge voltage arrester according to the invention.

Referring now to the figures of the drawing, there is shown therein a surge voltage arrester formed of a gas-tight housing wherein truncated cone-shaped electrodes 1 and 2 are disposed opposite one another forming a gap c therebetween and are inserted into the ends of a tubular insulating body 4. On the inside of the insulating body 4, at least one strip of electrically conductive material serving as an ignition strip 3 extends over part of the length of the insulating body or tube 4 in direction from the one to the other electrode 1, 2. In the embodiment according to FIG. 1, the ignition strip 3 terminates at a distance b before the respective electrode 1 or 2, at least one of the two distances a or b being shorter than the gap length c. The distance a of the ends of the ignition strip 3 from the respective side wall or lateral concave surface of the electrodes 1, 2 is preferably smaller, in this regard than the distance b to the bottom or base surface of the electrodes 1, 2, because this requires good isolation between the electrodes. In the embodiment according to FIG. 2, the ignition strip 3 is connected elelctrically conductively to either of the two elelctrodes 1, 2. Therefore, in this case, at least one of the two ignition strip distance sums $a_1+a_2$ or $b_1+b_2$ is smaller than the spacing c between the electrodes 1 and 2.

In the embodiment according to FIG. 3, the ignition strip 3 is connected to both electrodes 1, 2. In this case, the ignition strip 3 is interrupted at a location outside of or away from the burning space or gap between the electrodes 1, 2 over a length l, where l is smaller than the spacing c between the electrodes 1, 2.

The foregoing is a description corresponding to German Application P No. 31 13 349.5, dated Apr. 2, 1981, International priority of which is being claimed for the instant application, and which is hereby made part of this application. Any discrepancies between the foregoing specification and the aforementioned corresponding German application are to be resolved in favor of the latter.

There is claimed:

1. Surge voltage arrester with a gas-tight housing wherein two truncated cone-shaped electrodes are disposed respectively opposite one another and form a gap therebetween, the electrodes being received in opposite ends of a tubular insulating body and being formed with a bottom surface facing away from one another and out of the tubular insulating body and a lateral conical surface, comprising at least one strip of electrically conductive material serving as an ignition strip, said strip extending within the tubular body over part of the length thereof in direction from one to the other electrode, at least a part of said ignition strip terminating at a first distance opposite the lateral conical surface of the one electrode and at a second distance by which it is spaced from the bottom surface of the one electrode, at least one of said distances being shorter than the length of the gap.

2. Surge voltage arrester according to claim 1, wherein the strip is electrically connected to the other electrode.

3. Surge voltage arrester according to claim 1, wherein the strip, at opposite ends thereof, is located respective first and third distances opposite and away from the respective lateral conical surfaces of said one and said other electrode and respective second and fourth distances by which said strip ends, respectively, are spaced from the respective bottom surfaces of said one and said other electrode, respective sums of said first and said third distances, on the one hand, and of said second and said fourth distances, on the other hand, being smaller than the length of the gap.

4. Surge voltage arrester according to claim 3, wherein said first distance and the sum of said first and said third distances, respectively, are smaller than said second distance and the sum of said second and said fourth distances, respectively.

5. Surge voltage arrester according to claim 1, wherein said strip is electrically connected at both ends thereof to the respective electrodes and is formed with a break therein having a length shorter than the length of the gap.

6. Surge voltage arrester according to claim 4, wherein said break in said strip is located away from the gap.

7. Surge voltage arrester according to claim 1, wherein the electrodes have an activating material on active surfaces thereof, said activating material having a liberation coefficient greater than that of the material of the strip.

8. Surge voltage arrester according to claim 1, wherein said strip is formed of pencil graphite.

9. Surge voltage arrester according to claim 1, wherein said tubular insulating body is formed of glass having at least the inner surface thereof roughened by etching.

10. Method of producing a surge voltage arrester having a gas-tight housing wherein two truncated cone-shaped electrodes are disposed respectively opposite one another and form a gap therebetween, the electrodes being received in opposite ends of a tubular insulating body and being formed with a bottom surface facing away from one another and out of the tubular insulating body and a lateral conical surface, at least one strip of electrically conductive material serving as an ignition strip and extending within the tubular body in a direction from one to the other electrode, the strip having an interruption in the overall length thereof from electrode to electrode, at least a part of the ignition strip terminating at a first distance opposite the lateral conical surface of the one electrode and at a second distance by which it is spaced from the bottom surface of the one electrode, at least one of the distances being shorter than the length of the gap, which comprises initially terminating the part of the ignition strip at a distance shorter than said first and said second distances, respectively, from the lateral conical surface and the bottom surface of a respective electrode, burning off the respective end of the strip to said first and said second distances after gas-tightly sealing off the arrester by applying a voltage to and firing the arrester.

11. Method according to claim 10, wherein the strip is formed of graphite, and which comprises adding 0.1% to 10% oxygen to the atmosphere within the arrester when fusing the electrodes into the tubular insulating body so as to accelerate combustion of the graphite.

* * * * *